(12) United States Patent
Li

(10) Patent No.: US 7,085,941 B2
(45) Date of Patent: Aug. 1, 2006

(54) CLOCK CONTROL APPARATUS AND METHOD, FOR A MEMORY CONTROLLER, THAT PROCESSES A BLOCK ACCESS INTO SINGLE CONTINUOUS MACRO ACCESS WHILE MINIMIZING POWER CONSUMPTION

(75) Inventor: Jiang Li, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 459 days.

(21) Appl. No.: 10/414,013

(22) Filed: Apr. 16, 2003

(65) Prior Publication Data

US 2003/0200474 A1    Oct. 23, 2003

(30) Foreign Application Priority Data

Apr. 17, 2002   (JP)   ............... 2002-114295

(51) Int. Cl.
*G06F 1/26* (2006.01)
(52) U.S. Cl. ............... 713/300; 713/322; 713/320
(58) Field of Classification Search ............... 713/300, 713/322, 323, 320
See application file for complete search history.

(56) References Cited

U.S. PATENT DOCUMENTS

| 5,600,605 | A | * | 2/1997 | Schaefer | ............... 365/233 |
| 6,008,823 | A | * | 12/1999 | Rhoden et al. | ............... 345/541 |
| 6,340,973 | B1 | * | 1/2002 | Ochiai et al. | ............... 345/534 |
| 6,438,660 | B1 | * | 8/2002 | Reams | ............... 711/143 |

FOREIGN PATENT DOCUMENTS

| JP | 09-180438 | 7/1997 |
| JP | 409180438 A | * 7/1997 |

* cited by examiner

*Primary Examiner*—Thomas Lee
*Assistant Examiner*—Hari Patel
(74) *Attorney, Agent, or Firm*—Arent Fox, PLLC.

(57) ABSTRACT

A clock control apparatus for a memory controller comprises an interface unit which processes a block access to a plurality of banks of an SDRAM as a single continuous macro access in order to perform arbitration of the macro access, the block access externally supplied to the memory controller. A power-saving control unit controls both a clock signal of an internal circuit of the memory controller and a clock enable signal of the SDRAM in response to a control signal supplied from the interface unit.

8 Claims, 5 Drawing Sheets

□ bank0
▨ bank1
▨ bank2
▨ bank3 block size : 4×4

CLOCK CONTROL APPARATUS AND METHOD, FOR A MEMORY CONTROLLER, THAT PROCESSES A BLOCK ACCESS INTO SINGLE CONTINUOUS MACRO ACCESS WHILE MINIMIZING POWER CONSUMPTION

CROSS-REFERENCE TO RELATED APPLICATION

This application is based on Japanese priority application No. 2002-114295, filed on Apr. 17, 2002, the entire contents of which are hereby incorporated by reference.

BACKGROUND OF THE INVENTION

1. Field of the Invention

The present invention relates to a clock control apparatus and method for a memory controller for reduction of power consumption. More specifically, the present invention relates to a clock control apparatus and method that controls the clock signal to an internal circuit of a memory controller and the clock enable signal CKE to SDRAM when accessing image data of SDRAM per block or per line.

The clock control apparatus and method of the present invention are applicable to a memory controller of SDRAM for real-time processing applications, such as MPEG CODEC LSI or digital-broadcasting receivers, in order to effectively carry out reduction of power consumption of the memory controller when there is a definite access factor.

2. Description of the Related Art

SDRAM has various characteristics, such as the input/output circuit composition synchronized with the external clock, the command-format access capability, the continuous access capability by burst transmission, and the plural-bank composition.

Generally, when accessing image data of SDRAM, the clock enable signal CKE is set at "H" level. By supplying the bank active command (BANK ACTIVE) first, the row address of a memory location being accessed is given to the SDRAM. By supplying the read/write command (READ/WRITE) secondly, the column address of the memory location is given to the SDRAM.

The receiving of such commands by the SDRAM is performed in synchronism with the clock signal input to SDRAM.

The SDRAM is set in the active state in response to the received bank active command (BANK ACTIVE). The active state of the SDRAM is maintained until the precharge command (PRECHARGE) is subsequently input to the SDRAM.

In Japanese Laid-Open Patent Application No. 9-180438, a conventional memory controller including the function of controlling the clock enable signal (CKE) is given. The conventional memory controller is provided to perform the access control of a general-purpose SDRAM. The clock control function of the conventional memory controller is used to reduce the power consumption of SDRAM.

In the above-mentioned memory controller, when the access request is sent to SDRAM, the state of the clock enable signal CKE is changed from the inactive state to the active state. When the accessing of the general-purpose SDRAM is finished, the state of the clock enable signal CKE is returned from the active state to the inactive state. Thereby, the power consumption of the general-purpose SDRAM is reduced.

Unlike the above-mentioned memory controller of the general-purpose SDRAM, in a case of a memory controller of SDRAM for real-time processing applications, such as MPEG CODEC LSI or digital-broadcasting receivers, there is a definite access factor, and the efficiency of real-time processing must be increased.

In the case of the memory controller of the SDRAM for real-time processing applications, a sequence of several macro commands is collectively issued when accessing the SDRAM, which is different from the case of the memory controller of the general-purpose SDRAM. Hence, when the memory controller of SDRAM for real-time processing applications performs the clock control of the SDRAM for reduction of power consumption, it is necessary to perform the clock control for the entire sequence of such macro commands, not for a signal access to the data in the general-purpose SDRAM.

FIG. 1A and FIG. 1B are diagrams for explaining a clock control method of a conventional memory controller, which performs access control of a general-purpose SDRAM for reduction of power consumption.

For the sake of convenience of description, the conventional memory controller as shown in FIG. 1A and FIG. 1B will be called the general-purpose SDRAM controller.

FIG. 1A shows the function of a state control circuit of the general-purpose SDRAM controller to manage the active and inactive states of the general-purpose SDRAM. FIG. 1B is a time chart for explaining a change of the states of the general-purpose SDRAM when a back active command, a read/write command and a precharge command are input to the general-purpose SDRAM controller.

As shown in FIG. 1B, when the access request (REQUEST) occurs to the general-purpose SDRAM, the first read/write access is given to the general-purpose SDRAM with the clock enable signal (CKE) that is still in the inactive state. At this time, the state of the CKE in the general-purpose SDRAM is changed to the active state.

As shown in FIG. 1B, the general-purpose SDRAM changes to the active state, when the access request (REQUEST) occurs.

According to this access request, the clock enable signal CKE will rise and will be in the active state.

When the bank active command (BANK ACTIVE) following the access request is inputted, the clock enable signal CKE is the active state.

As shown in FIG. 1A, the state control circuit of the general-purpose SDRAM controller sets the clock enable signal CKE as the active state from the inactive state, when SDRAM shifts to the active state from the inactive state.

As shown in FIG. 1A, the state control circuit of the general-purpose SDRAM controller sets the clock enable signal CKE as the inactive state from the active state, when SDRAM shifts to the inactive state from the active state.

In the clock control by the general-purpose SDRAM controller as shown in FIG. 1B, there is the problem that it can respond only when the access unit is the single bank.

Moreover, in the case of the conventional general-purpose SDRAM controller, it is not taken into consideration about power saving of the internal circuit of the memory controller itself.

In SDRAM for real-time-processing applications, which, on the other hand, processes the image data of the MPEG specification, the frequency of small block access is high.

That is, by the memory controller of SDRAM for real-time-processing applications, the control in the case of accessing the image data on SDRAM per the block unit or line will be the requisite.

FIG. 2A and FIG. 2B are diagrams for explaining an example of a macro access to a plurality of banks of SDRAM.

In the following explanation, it is called macro access to process a series of commands in the block unit or the line unit to two or more banks of SDRAM.

FIG. 2A shows the access unit in case a macro access to data with the block size 4×4 is performed. FIG. 2B shows the command sequence, which creates interleaved access to each bank in the macro access of FIG. 2A.

As shown in FIG. 2B, by the memory controller of SDRAM for real-time-processing applications, the approach of macro access of creating interleaved access is adopted.

When the method of macro access shown in FIG. 2B is used, the access effectiveness of SDRAM for real-time-processing applications can be improved.

SUMMARY OF THE INVENTION

An object of the present invention is to provide an improved clock control apparatus and method for a memory controller in which the above-described problems are eliminated.

Another object of the present invention is to provide a clock control apparatus for a memory controller, which carries out a power-saving clock control of the real-timing processing SDRAM and the internal circuits of the memory controller for reduction of power consumption.

Another object of the present invention is to provide a clock control method for a memory controller, which carries out a power-saving clock control of the real-timing processing SDRAM and the internal circuits of the memory controller for reduction of power consumption.

The above-mentioned objects of the present invention are achieved by a clock control method for a memory controller, which comprises an interface unit to perform arbitration of a macro access, an address calculation circuit and a command sequence circuit. The interface unit processes a block access to a plurality of banks of an SDRAM as the macro access, the block access externally supplied to the memory controller. A power-saving control unit controls both a clock signal of the internal circuit of the memory controller and a clock enable signal of the SDRAM in response to a control signal supplied from the interface unit.

The above-mentioned objects of the present invention are achieved by a clock control method for a memory controller, which comprises the steps of: processing a block access to a plurality of banks of an SDRAM as a single continuous macro access in order to perform arbitration of the macro access, the block access externally supplied to the memory controller; and controlling both a clock signal of an internal circuit of the memory controller and a clock enable signal of the SDRAM in response to a control signal supplied during the arbitration of the macro access.

According to the clock control apparatus and method of the present invention, it is possible to efficiently carry out the power-saving clock control of the real-time processing SDRAM when a macro access including a sequence of several commands is given to the SDRAM by the request of the real-time processing. According to the present invention, not only the power-saving clock control of the SDRAM but also the power-saving clock control of the internal circuits of the memory controller can be realized.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 3:
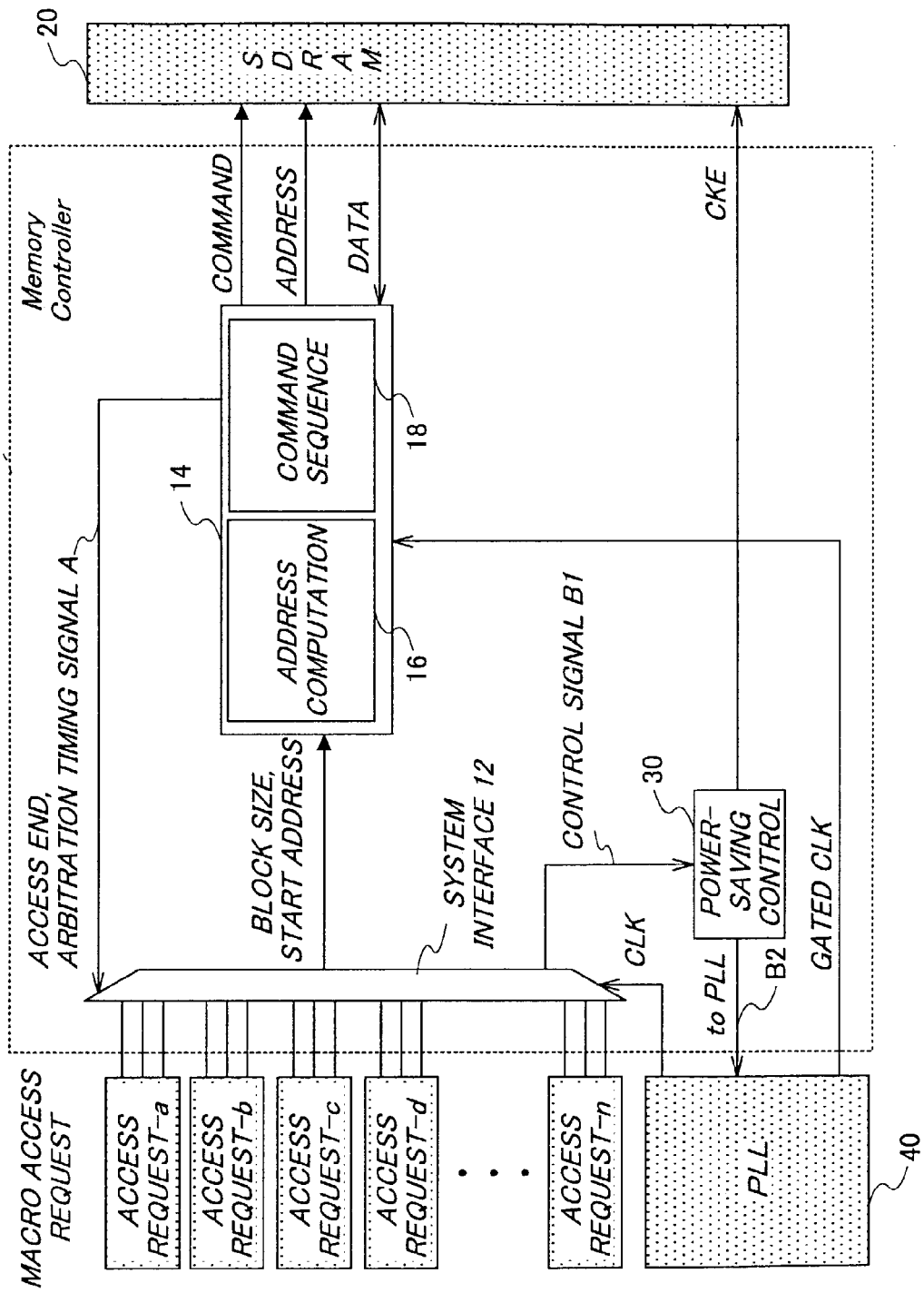
FIG. 3 is a block diagram of a memory controller to which one preferred embodiment of the clock control apparatus of the present invention is applied.

FIG. 3 shows the composition of a memory controller 10 to which one preferred embodiment of the clock control apparatus of the present invention is applied.

Figure 5:
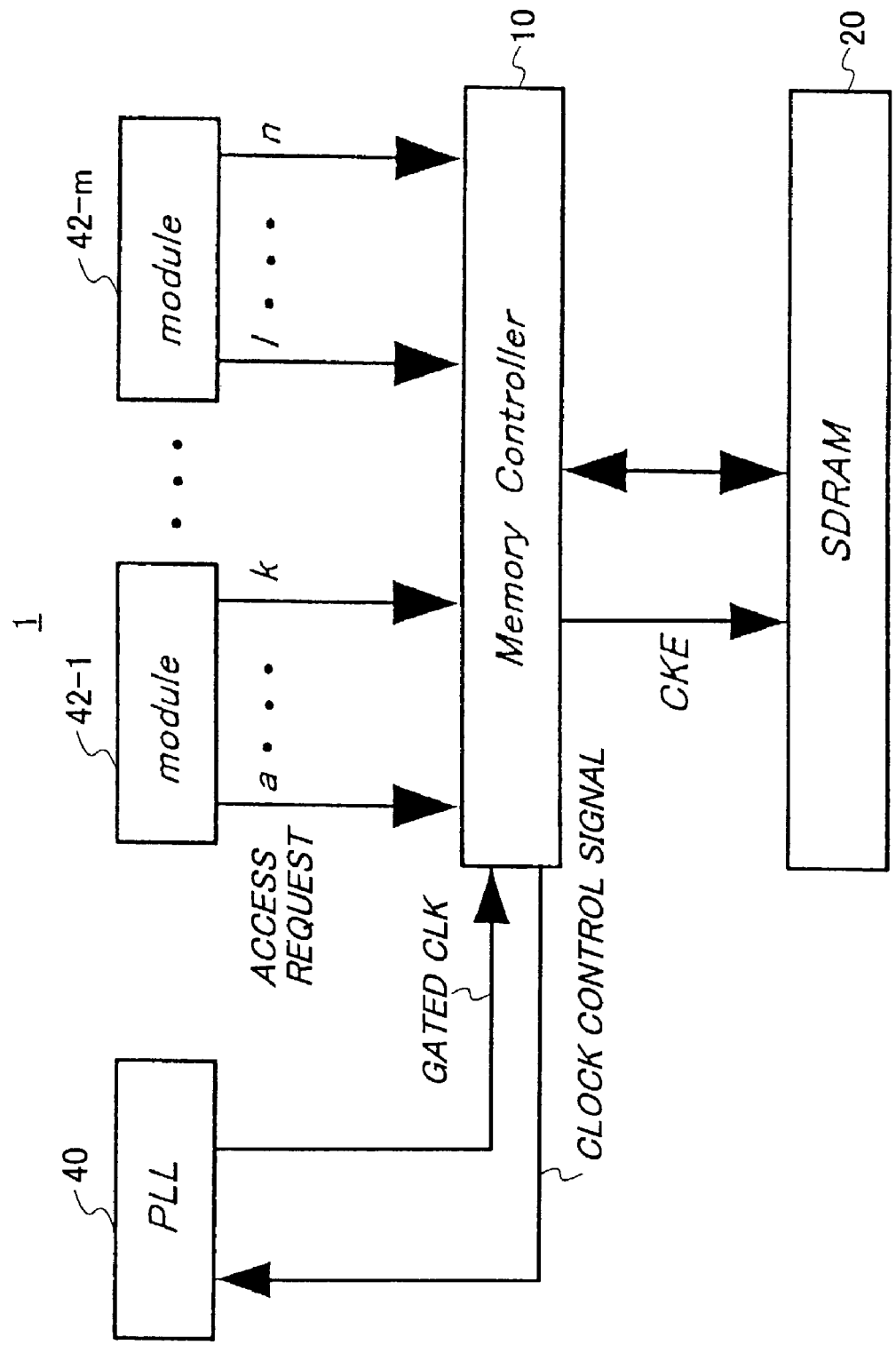
FIG. 5 is a block diagram showing the composition of a system including the memory controller of FIG. 3.

FIG. 5 shows the composition of a system including the memory controller 10 shown in FIG. 3 and an SDRAM 20 for real-time-processing applications.

As shown in FIG. 3, the memory controller 10 of this embodiment comprises a system interface (SI) circuit 12, an access-control unit 14, and a power saving control unit 30.

The access-control unit 14 includes an address computation circuit 16 and a command sequence control circuit 18.

As shown in FIG. 5, this system 1 comprises the SDRAM 20, the memory controller 10, a phase-locked loop (PLL) circuit 40, and a plurality of modules 42-1, . . . , 42-m.

For example, the SDRAM 20 is formed as a video memory for MPEG applications etc.

In order for the memory controller 10 to carry out access control of the SDRAM 20, the clock control apparatus and method of the present invention are applied to the memory controller 10.

The PLL circuit 40 supplies the clock signal (CLK) to the SI circuit 12 (FIG. 3) of the memory controller 10.

Moreover, the PLL circuit 40 receives the clock control signal (which will be described later) from the memory controller 10.

In response to this control signal, the PLL circuit 40 controls the state (the active or inactive state) of the gate clock signal (GATED CLK) supplied to the access-control unit 14 (FIG. 3) of the memory controller 10.

Moreover, the plurality of modules 42-1, . . . , 42-m in the system 1 generate the macro access to the SDRAM 20 by sending each access request (a, b, . . . , n) to the memory controller 10.

Figure 1A:
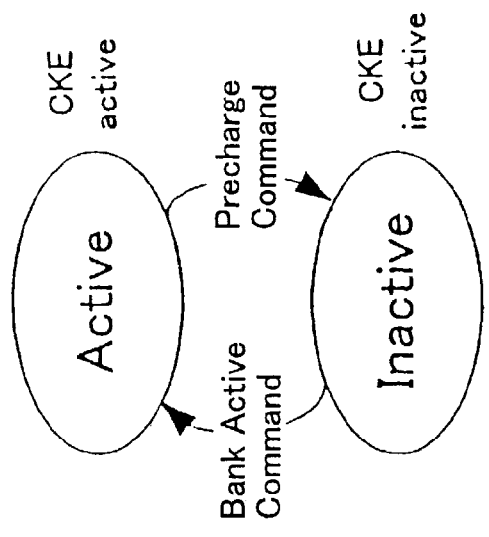
FIG. 1A and FIG. 1B are diagrams for explaining a conventional clock control method of a memory controller, which performs access control of a general-purpose SDRAM for reduction of power consumption.
Figure 1B:
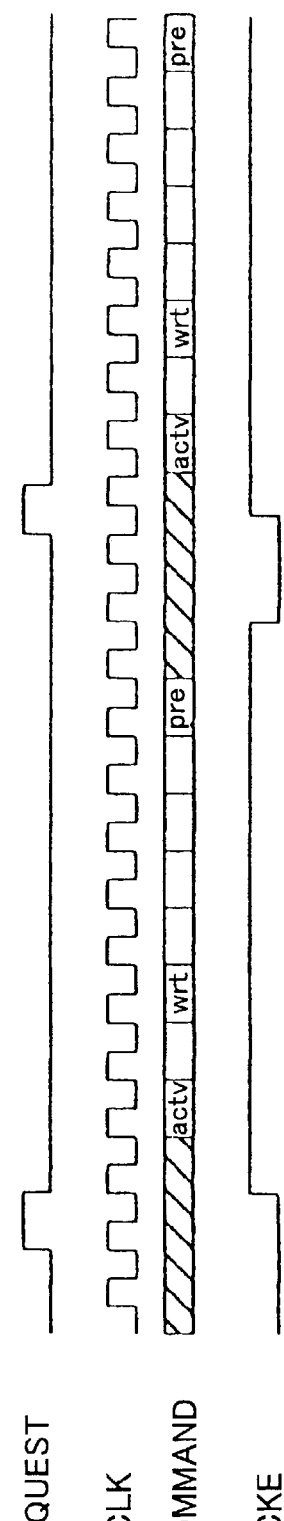
Figure 2A:
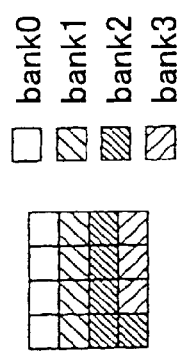
FIG. 2A and FIG. 2B are diagrams for explaining an example of a macro access to a plurality of banks of SDRAM for real-time processing applications.
Figure 2B:
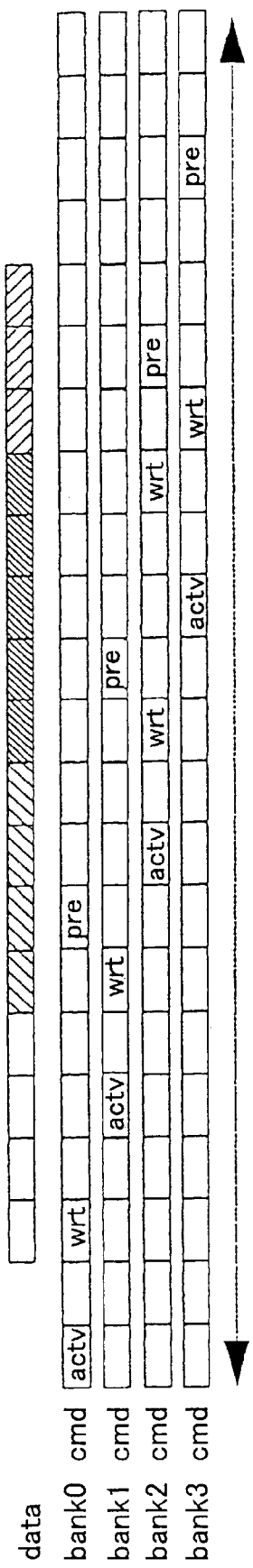

From the plurality of modules, as shown in FIG. 2, the macro access which carries out the access request per block or per line to the plurality of banks of the SDRAM 20 is supplied to the memory controller 10.

The interface between the system 1 and the memory controller 10 is controlled by the SI circuit 12 as shown in FIG. 3.

The SI circuit 12 receives the macro-access requests (a, b, . . . , n) from the modules of the system 1, and extracts the task (access block), which is going to arbitrate the access request of various kinds and is going to access it.

The SI circuit 12 supplies the command of each extracted task, which includes the head address and block size of each access block, to the address computation circuit 16. The SI circuit 12 supplies the command of the extracted task to the command sequence control circuit 18.

The address computation circuit 16 of the access-control unit 14 generates the address signal, which indicates the address of the access memory location of the SDRAM 20 based on the head address and block size of the access block, and sends it out to the SDRAM 20.

In the block access, the command sequence control circuit 18 of the access-control unit 14 issues the macro command for the command sequence of each bank efficiently to the SDRAM 20 by the request of real time processing.

In the clock control apparatus of the memory controller 10 of FIG. 3, the clock signal (GATED CLK) of the address computation circuit 16 and the command sequence control circuit 18 and the clock enable signal (CKE) of the SDRAM 20 are controlled by the arbitration of the macro access by the SI circuit 12, and clock control by the power-saving control circuit 30.

In the clock control apparatus of the memory controller 10 of FIG. 3, the clock signal (CLK) is always supplied to the SI circuit 12 from the PLL circuit 40, and the SI circuit 12 operates synchronizing with this clock signal (CLK).

If there is no SDRAM access request from the outside, the clock (GATED CLK) of the address computation circuit 16 and the command sequence control circuit 18 will be suspended, and the address computation circuit 16 and the command sequence control circuit 18 will go into the inactive state.

The SDRAM 20 is set in the inactive state by control of the clock enable signal CKE sent from the power-saving control circuit 30.

In the clock control apparatus of the memory controller 10 of FIG. 3, when the SI circuit 12 detects the access request of the SDRAM 20 from the outside, supply of the clock signal (GATED CLK) of the address computation circuit 16 of the access-control unit 14 and the command sequence control circuit 18 begins.

Moreover, when the access request is detected, the SDRAM 20 shifts to the active state from the inactive state because the clock enable signal CKE supplied to the SDRAM 20 from the power-saving control circuit 30 shifts to the active state from the inactive state. The memory controller 10 goes into the active state at this time.

If the address computation circuit 16 and the command sequence control circuit 18 detect the end of the macro access, they will notify it to the SI circuit 12.

The memory controller 10 shifts to the power-saving state from the active state because the SI circuit 12 controls the stop of the clock signal (GATED CLK) of the internal circuits of the memory controller, and the clock enable signal CKE of the SDRAM 20 according to this notice.

As the clock signal (CLK) is always supplied to the SI circuit 12, it comes to be able to perform the arbitration of the new access request signal.

Figure 4:
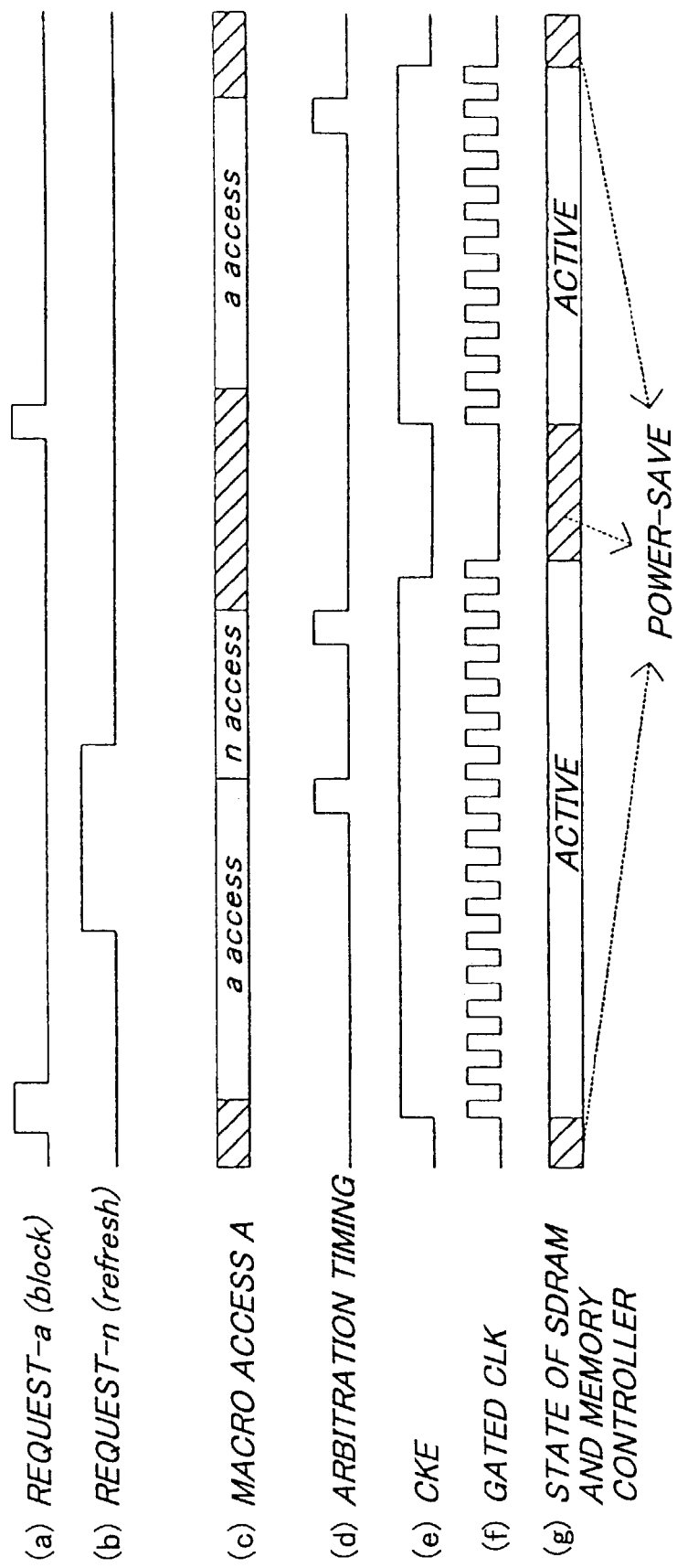
FIG. 4 is a time chart for explaining one preferred embodiment of the clock control method of the present invention.

FIG. 4 is a time chart for explaining one preferred embodiment of the clock control method of the present invention.

The embodiment of FIG. 4 shows operation of the memory controller 10 when the block access request-a and the REFRESH request n input into the SI circuit 12 as a macro access from the exterior (from the plurality of modules of the system 1).

As shown in FIG. 4, the clock enable signal CKE of the initial state of the SDRAM 20 before the block access request-a occurs is set in the inactive state, and the SDRAM 20 is set in the inactive state.

At this time, the clock signal (GATED CLK) of the address computation circuit 16 in the access-control unit 14 of the memory controller 10 and the command sequence control circuit 18 is in the inactive state of the clock stop.

In the following, the inactive state of the clock stop will be called the power-saving state, for the sake of convenience.

Namely, in the initial state, both the SDRAM 20 and the internal circuits of the memory controller (the address computation circuit 16 and the command sequence control circuit 18) are in the power-saving state (refer to FIG. 4(g)).

On the contrary, when the clock signal (GATED CLK) of the address computation circuit 16 and the command sequence control circuit 18 is set in the active state, the internal circuits of the memory controller are set in the active state.

Moreover, when the clock enable signal CKE is set in the active state, the SDRAM 20 is set in the active state (see FIG. 4(g)).

When the block access request-a is inputted from the exterior to the SI circuit 12 as shown in FIG. 4(a), the SI circuit 12 sets the control signal B1 supplied to the power-saving control circuit 30, in the ON state.

At this time, the power-saving control circuit 30 is active in the clock enable signal CKE supplied to the SDRAM 20—it is set as (H) (see FIG. 4(e)).

Moreover, the power-saving control circuit 30 sets simultaneously the clock control signal B-2 supplied to the PLL circuit 40, in the ON state.

According to this, the clock signal (GATED CLK) supplied to the access-control unit 14 from the PLL circuit 40 shifts to the active state (see FIG. 4(f)).

Therefore, the SI circuit 12 and the power-saving control circuit 30 carry out the control so that the internal circuits of the memory controller 10 and the SDRAM 20 to shift to the active state.

Simultaneously, the SI circuit 12 supplies the block head address and block size of the access request-a to the address computation circuit 16, and supplies the command of the access request-a to the command sequential circuit 18, and the normal access operation to the SDRAM 20 is performed.

And the address computation circuit 16 and the command sequence control circuit 18 detect the end of access, and set the arbitration timing signal A supplied to the SI circuit 12 in the ON state (H).

According to the arbitration timing signal A, it detects whether there is a next access request of the macro access in the SI circuit 12.

When the next request (REFRESH request n) is detected at this time, the SI circuit 12 and the power-saving control circuit 30 will start the next access operation.

The SI circuit 12 and the power-saving control circuit 30 perform control that continues the operating state as well as the control action.

On the contrary, since it means detecting the end of the macro access when it detects that answer the arbitration timing signal A of the ON state (H), and the SI circuit 12 does not have the next access request, the SI circuit 12 and the power-saving control circuit 30 perform control in which the internal circuit and the SDRAM 20 of the memory controller 20 are made to shift to the power-saving state from the active state.

That is, when the end of the macro access is detected, the SI circuit 12 sets the control signal B1 supplied to the power-saving control circuit 30, in the OFF state.

At this time, the power-saving control circuit 30 sets the clock enable signal CKE supplied to the SDRAM 20, in the inactive state (L) (see FIG. 4(e)).

Moreover, the power-saving control circuit 30 sets simultaneously the clock control signal B-2 supplied to the PLL circuit 40, in the OFF state.

In response to this, the clock signal (GATED CLK) supplied to the access-control unit 14 from the PLL circuit 40 is set in the inactive state (FIG. 4(f)).

Therefore, the SI circuit 12 and the power-saving control circuit 30 perform the control so that the internal circuits of the memory controller 10 and the SDRAM 20 shift to the power-saving state from the active state at this time.

In the above embodiment, the power-saving control of the memory controller 10 to the macro access has been described. However, the power-saving control of the memory controller 10 may be performed also to the single access similar to the case of the macro access.

When the clock control apparatus and method for the memory controller in the above embodiment are used, the power-saving control of the SDRAM 20 and the internal circuits of the memory controller to the macro access of the SDRAM for real time processing applications can be realized.

Therefore, according to the clock control apparatus and method of the present invention, it is possible to efficiently carry out the power-saving clock control of the real-time processing SDRAM when a macro access including a sequence of several commands is given to the SDRAM by the request of the real-time processing. According to the present invention, not only the power-saving clock control of the SDRAM but also the power-saving clock control of the internal circuits of the memory controller can be realized.

The present invention is not limited to the above-described embodiments, and variations and modifications may be made without departing from the scope of the present invention.

What is claimed is:

1. A clock control apparatus for a memory controller, comprising:
   an interface unit which processes a block access to a plurality of banks of an SDRAM as a single continuous macro access in order to perform arbitration of the macro access, the block access externally supplied to the memory controller; and
   a power-saving control unit which controls both a clock signal of an internal circuit of the memory controller and a clock enable signal of the SDRAM in response to a control signal which is supplied from the interface unit when an end of the macro access is detected.

2. The clock control apparatus of claim 1 wherein the internal circuit comprises an address computation unit and a command sequence control unit, and when the internal circuit detects an end of the macro access, the power-saving control unit sets a clock signal of the address computation unit and the command sequence control unit in an inactive state and sets the clock enable signal of the SDRAM in an inactive state.

3. The clock control apparatus of claim 1 wherein the interface unit controls a start of operation of the SDRAM by the arbitration of the macro access, the internal circuit detects an end of the macro access, and the power-saving control unit controls the clock enable signal of the SDRAM in order to perform a power-saving control.

4. The clock control apparatus of claim 1 wherein, when an end of the macro access is detected, the power-saving control unit sets both the clock signal of the internal circuit and the clock enable signal of the SDRAM in inactive states according to an arbitration timing signal supplied from the internal circuit to the interface unit.

5. A clock control method of a memory controller, comprising the steps of:
   processing a block access to a plurality of banks of an SDRAM as a single continuous macro access in order to perform arbitration of the macro access, the block access externally supplied to the memory controller; and
   controlling both a clock signal of an internal circuit of the memory controller and a clock enable signal of the SDRAM in response to a control signal which is supplied when the end of the macro access is detected.

6. The clock control method of claim 5 wherein the internal circuit comprises an address computation unit and a command sequence control unit, and when the internal circuit detects an end of the macro access, a clock signal of the address computation unit and the command sequence control unit is set in an inactive state by the controlling step, and the clock enable signal of the SORAM is set in an inactive state by the controlling step.

7. The clock control method of claim 5 wherein the processing step includes the step of controlling a start of operation of the SDRAM by the arbitration of the macro access, the processing step includes the step of detecting an end of the macro access, and the step of controlling the clock enable signal of the SORAM in order to perform a power-saving control.

8. The clock control method of claim 5 wherein the controlling step includes the step of setting, when an end of the macro access is detected, both the clock signal of the internal circuit and the clock enable signal of the SDRAM in inactive states according to an arbitration timing signal supplied from the internal circuit.

* * * * *